US012759269B2

(12) United States Patent
Dunn et al.

(10) Patent No.: US 12,759,269 B2
(45) Date of Patent: Oct. 13, 2026

(54) COMPOSITE PANELS AND METHODS FOR MANUFACTURING THE SAME

(71) Applicant: General Electric Company, Schenectady, NY (US)

(72) Inventors: Daniel Gene Dunn, Guilderland, NY (US); Henry Charles McGuigan, Duanesburg, NY (US); Reza Sarrafi-Nour, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 631 days.

(21) Appl. No.: 18/162,940

(22) Filed: Feb. 1, 2023

(65) Prior Publication Data

US 2024/0253333 A1 Aug. 1, 2024

(51) Int. Cl.

*B32B 18/00* (2006.01)
*C04B 35/565* (2006.01)
*C04B 37/00* (2006.01)

(52) U.S. Cl.

CPC ............ *B32B 18/00* (2013.01); *C04B 35/565* (2013.01); *C04B 37/005* (2013.01); *C04B 37/008* (2013.01); *B32B 2250/02* (2013.01); *C04B 2235/616* (2013.01); *C04B 2237/083* (2013.01); *C04B 2237/086* (2013.01)

(58) Field of Classification Search

None

See application file for complete search history.

(56) References Cited

U.S. PATENT DOCUMENTS

| | | | | |
|---|---|---|---|---|
| 3,533,712 | A | 10/1970 | Kercher | |
| 4,465,725 | A | 8/1984 | Riel | |
| 4,808,460 | A * | 2/1989 | Chyung | C04B 38/0006 428/116 |
| 4,836,084 | A | 6/1989 | Vogelesang et al. | |
| 5,594,216 | A | 1/1997 | Yasukawa et al. | |
| 6,122,892 | A | 9/2000 | Gonidec et al. | |
| 6,480,540 | B1 | 11/2002 | Guillotel | |
| 6,607,625 | B2 | 8/2003 | Andre et al. | |
| 6,984,100 | B2 | 1/2006 | Bunker et al. | |
| 7,435,053 | B2 | 10/2008 | Liang | |
| 7,670,113 | B1 | 3/2010 | Liang | |

(Continued)

FOREIGN PATENT DOCUMENTS

| | | | |
|---|---|---|---|
| CN | 112620582 | A | 4/2021 |
| DE | 20022959 | U1 | 11/2002 |

(Continued)

OTHER PUBLICATIONS

Machine translation of EP3050862A2 via EPO, translated Aug. 8, 2025 (Year: 2016).*

*Primary Examiner* — Elizabeth Collister
(74) *Attorney, Agent, or Firm* — Dority & Manning, P.A.

(57) ABSTRACT

A method of assembling a composite panel includes disposing a pliable matrix material between a first side of a ceramic core structure and a ceramic matrix composite face sheet, wherein the ceramic core structure comprises a plurality of hollow cells defined by a plurality of walls extending from the first side of the ceramic core structure to a second side of the ceramic core structure opposite the first side; and densifying the pliable matrix material to bond the pliable matrix material with the ceramic core structure and the ceramic matrix composite face sheet.

18 Claims, 6 Drawing Sheets

(56) References Cited

U.S. PATENT DOCUMENTS

| | | | |
|---|---|---|---|
| 8,167,537 | B1 | 5/2012 | Plank et al. |
| 8,640,825 | B2 | 2/2014 | Vauchel et al. |
| 8,899,512 | B2 | 12/2014 | Vauchel et al. |
| 9,108,385 | B2 | 8/2015 | Deschamps et al. |
| 9,683,443 | B2 | 6/2017 | Freeman et al. |
| 9,741,331 | B1 | 8/2017 | Alam et al. |
| 10,260,354 | B2 | 4/2019 | Bunker |
| 10,287,894 | B2 | 5/2019 | Dutta et al. |
| 10,384,981 | B2 | 8/2019 | Hall et al. |
| 10,472,973 | B2 | 11/2019 | Dutta et al. |
| 10,577,943 | B2 | 3/2020 | Marinelli et al. |
| 10,583,489 | B2 | 3/2020 | Morgan et al. |
| 10,590,776 | B2 | 3/2020 | Dutta et al. |
| 10,696,600 | B2 | 6/2020 | Polster et al. |
| 10,794,246 | B2 | 10/2020 | Leyko et al. |
| 11,021,971 | B2 | 6/2021 | Holowczak et al. |
| 11,047,240 | B2 | 6/2021 | Frey et al. |
| 11,047,304 | B2 | 6/2021 | Lin et al. |
| 2011/0129640 | A1 | 6/2011 | Beall et al. |
| 2015/0016972 | A1 | 1/2015 | Freeman et al. |
| 2016/0003106 | A1 | 1/2016 | Fouquet et al. |
| 2017/0009600 | A1 | 1/2017 | Grasso et al. |
| 2017/0122114 | A1* | 5/2017 | Kittleson .............. C04B 35/565 |
| 2018/0065337 | A1 | 3/2018 | Grasso et al. |
| 2018/0166058 | A1 | 6/2018 | Delehouze et al. |
| 2018/0281339 | A1* | 10/2018 | Hull ........................ B32B 9/005 |
| 2020/0299200 | A1 | 9/2020 | Sheedy et al. |
| 2020/0309029 | A1 | 10/2020 | Boileau et al. |
| 2021/0001511 | A1 | 1/2021 | Jin et al. |
| 2021/0156265 | A1 | 5/2021 | Rathay et al. |
| 2021/0189886 | A1 | 6/2021 | Dyson et al. |
| 2021/0189901 | A1 | 6/2021 | Dyson et al. |
| 2021/0254475 | A1 | 8/2021 | Dyson et al. |
| 2021/0390940 | A1 | 12/2021 | Desjoyeaux et al. |

FOREIGN PATENT DOCUMENTS

| | | | |
|---|---|---|---|
| EP | 3050862 | A2 | 8/2016 |
| FR | 3044961 | A1 | 6/2017 |
| GB | 2532704 | A | 6/2016 |
| RU | 2720151 | C1 | 4/2020 |
| WO | WO2019179702 | A1 | 9/2019 |
| WO | WO2021/067978 | A1 | 4/2021 |

* cited by examiner

COMPOSITE PANELS AND METHODS FOR MANUFACTURING THE SAME

FIELD

The present disclosure relates to composite panels, and more particularly, composite panels with cores having a plurality of hollow cells.

BACKGROUND

Modern machinery such as airplanes, automobiles, marine, rockets, space vehicles or industrial equipment may be subject to extreme operating conditions that include high temperatures, high pressure, and high speeds. Reinforced ceramic matrix composites ("CMCs") comprising fibers dispersed in continuous ceramic matrices of the same or a different composition are well suited for structural applications because of their toughness, thermal resistance, high-temperature strength, and chemical stability. Such composites typically have high strength-to-weight ratio and maintain this attribute over a broad range of temperatures that exceeds metallic alloys. This renders them attractive in applications in which weight is a concern and high temperature structural attributes highly constrain the design of components and systems, such as in aeronautic and space vehicle applications. Their stability at high temperatures renders CMCs very suitable in applications in which components are in contact with a high-temperature gas, such as in a gas turbine engine and re-entry conditions of space vehicles in terrestrial and non-terrestrial environments.

Further, these machines may produce noise. The environmental noise caused by airplanes, automobiles, and other modern machinery can often be an annoyance. To maintain noise below acceptable levels, noise suppression techniques are often employed. Noise suppression technology has a wide variety of industrial and residential applications. Noise suppression devices are often applied in heating ventilation and air conditioning (HVAC) systems, industrial machinery and complexes, transportation vehicles, and any machinery that may tend to produce unacceptably high levels of noise.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
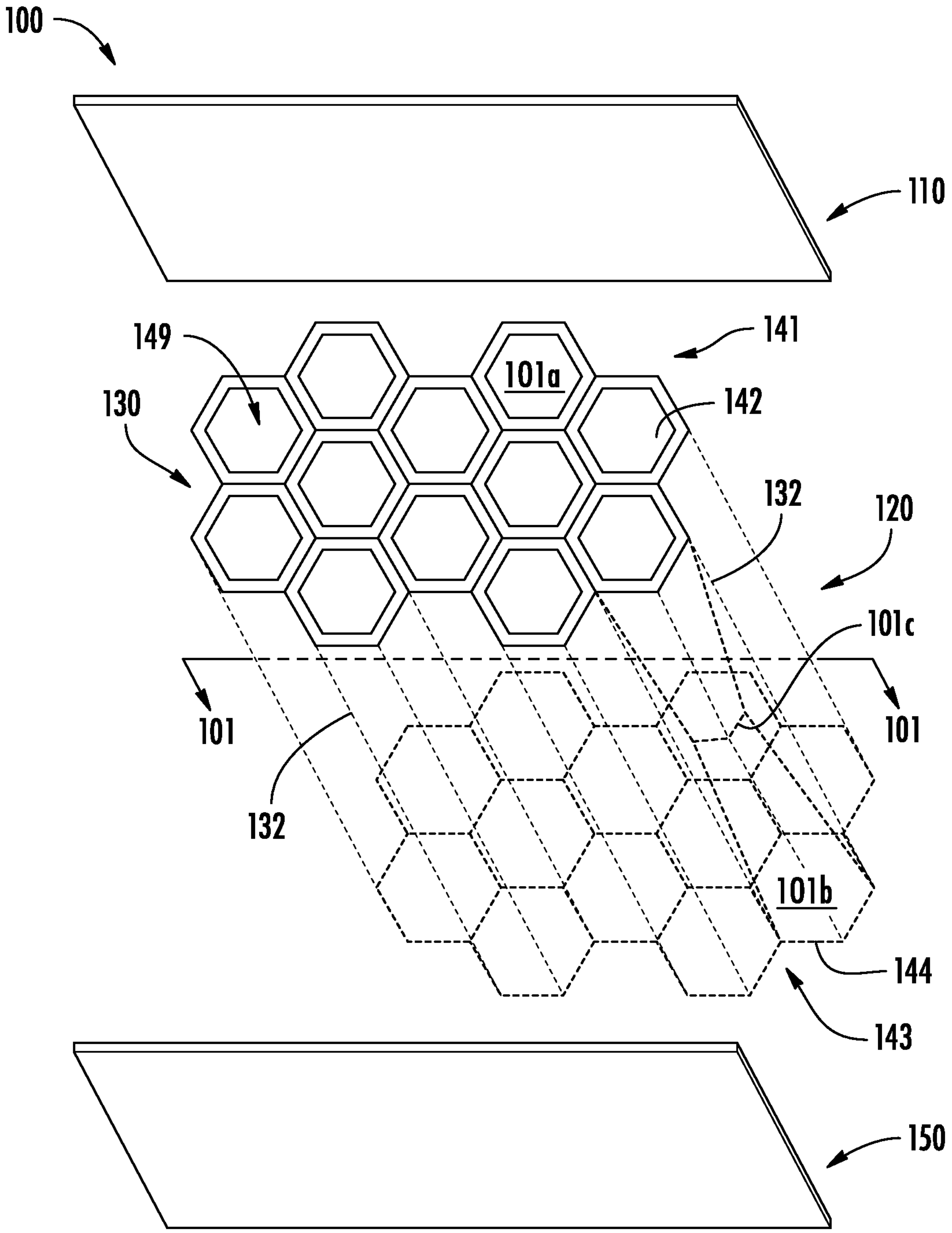
FIG. 1 provides an exploded perspective view of an exemplary composite panel with a plurality of cells, the cells being in a hexagonal shape.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, ceramic matrix composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_32SiO_2$), as well as glassy aluminosilicates.

In certain embodiments, the reinforcing fibers may be bundled or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine, space vehicle structure, and propulsion components used in higher temperature sections, such as airfoils (e.g., turbines, and vanes), combustors, shrouds and other like components, nozzles, transition ducts, thermal protection systems, TPS, aerodynamic control surfaces and leading edges that would benefit from the lighter-weight and higher temperature capability these materials can offer.

As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Binder Jet technology, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed the subject matter.

Additive manufacturing technology may generally be described as fabrication of objects by building objects point-by-point, line-by-line, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, or any other suitable material that may be in solid, powder, sheet material, wire, or any other suitable form, or combinations thereof. Additionally, or in the alternative, exemplary materials may include metals, ceramics, or binders, as well as combinations thereof. Exemplary ceramics may include ultra-high-temperature ceramics, or precursors for ultra-high-temperature ceramics, such as polymeric precursors. Each successive layer may be, for example, between about 10 μm and 200 μm, although the thickness may be determined based on any number of parameters and may be any suitable size.

As used herein, the term "build plane" refers to a plane defined by a surface upon which an energy beam impinges to selectively irradiate and thereby consolidate powder material during an additive manufacturing process. Generally, the surface of a powder bed defines the build plane. During irradiation of a respective layer of the powder bed, a previously irradiated portion of the respective layer may define a portion of the build plane. Prior to distributing powder material across a build module, a build plate that supports the powder bed generally defines the build plane.

As used herein, the term "consolidate" or "consolidating" refers to densification and solidification of powder material as a result of irradiating the powder material, including by way of melting, fusing, sintering, or the like.

The present disclosure is generally related to composite panels having a plurality of hollow cells. While ceramic composite materials provide good toughness, high thermal insulation, high-temperature strength, and chemical stability, the raw material and processing techniques can become expensive. Current structures capable of withstanding extreme operation conditions may be bulky, expensive, or have short lifespans. Accordingly, a lighter, stronger, and more cost-effective structure would be welcomed in the art. Composite panels can provide for similar properties while reducing weight of the component, and notably, the amount of ceramic matrix composite material used in the component. However, the relatively thin walls of the core structure provides limited bonding area to connect the core structure with one or more face sheets.

The present disclosure provides composite panels having a plurality of hollow cells, wherein a pliable matrix material is utilized to bond the various components together. The pliable matrix material can comprise reinforcement material, such as material similar to that in the adjacent components, to provide similar and compatible properties throughout the composite panel. Moreover, the flexible application of the pliable matrix material can provide enhanced bonding capability between the core structure and the composite face sheet or composite back sheet by accommodating dimensional mismatches between individual components.

Referring now to the drawings, wherein identical numerals indicate the same elements throughout the figures, FIG. 1 shows an exploded view of composite panel 100 that can be manufactured in accordance with one or more of the methods disclosed and described herein. According to one or more embodiments described herein. The composite panel 100 generally comprises a ceramic core structure 120 and a ceramic matrix composite face sheet 110 bonded to a first side of the core structure 120. For illustrative purposes and ease of clarity, the first side is also referred to as the top side 141. In some embodiments, such as that illustrated in FIG. 1, the composite panel 100 may further comprise a ceramic matrix composite back sheet 150 bonded to a second side of the core structure 120 and opposite the first side. For illustrative purposes and ease of clarity, the second side is also referred to as the bottom side 143, which is opposite the top side 141. The ceramic core structure 120 may also comprise a cross-sectional geometry 101 that is non-uniform from the top side 141 to the bottom side 143. As used herein, the cross-sectional geometry 101 refers to the open, or closed, space between the plurality of walls at any point along the length of any individual cell. Such a configurations can provide a top face 142 of the ceramic core structure 120 or a bottom side 143 of the ceramic core structure 120 that produces a lighter composite panel 100 compared to a completely solid composite material. In some embodiments, the cross-sectional geometry 101 may be hexagonal, circular, square, or triangular.

The ceramic matrix composite face sheet 110 and the ceramic matrix composite back sheet 150 can comprise any ceramic matrix composite (also referred to as "CMCs"). Ceramic matrix materials generally comprise a fibrous reinforcement material embedded in matrix material. The reinforcement material serves as a load-bearing constituent of the composite material, while the matrix of a composite material serves to bind the fibers together and act as the medium by which an externally applied stress is transmitted and distributed to the fibers. Generally, CMCs are well suited for structural applications because of their toughness, thermal resistance, high-temperature strength, and chemical stability. Such composites may have high strength-to-weight ratio that renders them attractive in applications in which weight is a concern, such as in aeronautic applications. Further, their stability at high temperatures renders CMCs very suitable in applications in which components are in contact with a high-temperature gas, such as within a gas turbine engine.

Exemplary CMC materials may include silicon carbide (SiC), silicon, silica, carbon, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., 3M's Nextel 440 and 480), and chopped whiskers and fibers (e.g., 3M's Nextel 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform (e.g., prepreg plies) or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

The ceramic core structure 120 may comprise the same material or a different material compared to the ceramic matrix composite face sheet 110 or the ceramic matrix composite back sheet 150. By way of non-limiting example, the core structure 120 may be such as a material that is less dense than the material of the ceramic matrix composite face sheet 110 or the ceramic matrix composite back sheet 150. In some embodiments, the ceramic core structure 120 may include a foam core or other porous ceramic material. However, even when the material of the ceramic core structure 120 is different, it is compatible with the ceramic matrix composite face sheet 110 and the ceramic matrix composite back sheet 150 to produce a sufficient bond between the components, including in extreme operating conditions such as high temperatures. In exemplary embodiments, the ceramic core structure 120 may include silicon carbide (SiC) or silicon (Si).

The ceramic core structure 120 comprises a plurality of hollow cells 130 defined by a plurality of walls 132 extending from a top face 142 on a top side 141 to a bottom face 144 on a bottom side 143. Each of the plurality of hollow cells 130 that form the ceramic core structure 120 can extend in a parallel direction with one another. Moreover, each top face 142 for each of the plurality of hollow cells 130 may be planar with one another so that the top side 141 of the ceramic core structure 120 comprises a substantially flat plane comprising a plurality of top faces 142 from the plurality of hollow cells 130. Likewise, each bottom face 144 for each of the plurality of hollow cells 130 may be planar with one another so that the bottom side 143 of the ceramic core structure 120 comprises a substantially flat plane comprising a plurality of bottom faces 144 from the plurality of hollow cells 130. In such embodiments, the top faces 142 and the bottom faces 144 may be parallel with one another such the ceramic matrix composite face sheet 110 being bonded to the top side 141 of the ceramic core structure 120 will be parallel with the ceramic matrix composite back sheet 150 being bonded to the bottom side 143 of the ceramic core structure 120.

While the ceramic core structure 120 in FIG. 1 is illustrated as having a plurality of hollow cells 130 that are parallel with one another, are the same length as one another, and comprise a top side 141 parallel with a bottom side 143, it should be appreciated that a variety of alternative or additional configurations may also be realized within the scope of this disclosure. For example, the plurality of hollow cells 130 may comprise different lengths, may comprise different orientations, may produce top sides 141 and bottom sides 143 that are not planar or not parallel with one another, or any combination thereof. Moreover, the plurality of walls 132 may be brought together to form the plurality of hollows cells 130 using a variety of different techniques. For instance, as a non-limiting example, the plurality of walls 132 may be unitarily formed, monolithically formed, or unitarily and monolithically formed.

As illustrated in FIG. 1, the plurality of walls 132 of the plurality of hollow cells 130 define the shape, and more specifically, the cross-sectional geometry 101, of each of the plurality of hollow cells 130. That is, the plurality of walls 132 create a partially closed structure (i.e., enclosed by the plurality of walls 132 on the side but potentially open on the ends at the top face 142 or the bottom face 144) to define a hollow interior 149 to form a cross-sectional geometry 101 for each of the plurality of cells. As used herein, the cross-sectional geometry 101 refers to the open, or closed, space between the plurality of walls 132 at any point along the length of any individual cell.

Moreover, the cross-sectional geometry 101 may have an open cross-sectional area that is smaller, larger, or have a different shape at one or more locations along at least a portion of one of the plurality of hollow cells 130. Various exemplary configurations of the cross-sectional geometries 101 are presented in FIGS. 2-9. In some embodiments, the cross-sectional geometry 101 from the top face 142 to the bottom face 144 may be uniform for one or more of the plurality of hollow cells 130. That is, the hollow cell 130 will have the same cross-sectional geometry 101 throughout its entire length. Alternatively, or additionally, one or more of the plurality of hollow cells 130 may comprise a cross-sectional geometry 101 from the top face 142 to the bottom face 144 that is nonuniform. That is, the cross-sectional geometry 101 may have an open cross-sectional area that is smaller, larger, or have a geometry that is a different shape at one or more locations along at least one of the plurality of hollow cells 130 to provide an overall cross-sectional geometry 101 that is nonuniform between its top side 141 and bottom side 143. Having a cross-sectional geometry 101 that is nonuniform may facilitate enhanced bonding with ceramic matrix composite face sheet 110 or the ceramic matrix composite back sheet 150, such as by providing additional material or surface area on a top side 141 or bottom side 143 of the ceramic core structure 120, while still reducing the amount of overall material used in the ceramic core structure via the overall configuration of the plurality of hollow cells 130.

For example, each of the plurality of cells will have a top cross-sectional geometry 101*a* at its top face 142 and a bottom cross-sectional geometry 101*b* at its bottom face 144. The top cross-sectional geometry 101*a* and the bottom cross-sectional geometry 101*b* can be different from one another (e.g., one cross-sectional area that is smaller than the other) to provide a cross-sectional geometry of the hollow cell that is nonuniform. The cross-sectional geometry 101 can thereby comprise a variety of different configurations at different locations. As illustrated in FIG. 1, in some embodiments, at least one of the plurality of hollow cells 130 of the composite panel 100 has a midspan cross-sectional geometry 101*c* at a location between the top face 142 and the bottom face 144 that has an open cross-sectional area that is smaller than that at the top face 142 or at the bottom face 144. As used herein, midspan refers to any location between the top faced 142 and the bottom face 144, whether it is halfway therebetween or skewed towards one face. In some embodiments, the midspan cross-sectional geometry 101*c* has an open cross-sectional area that is smaller than that at both the top cross-sectional geometry 101*a* and the bottom cross-sectional geometry 101*b*. Such embodiments provide an hourglass-type configuration within the hollow cell 130.

Figure 2:
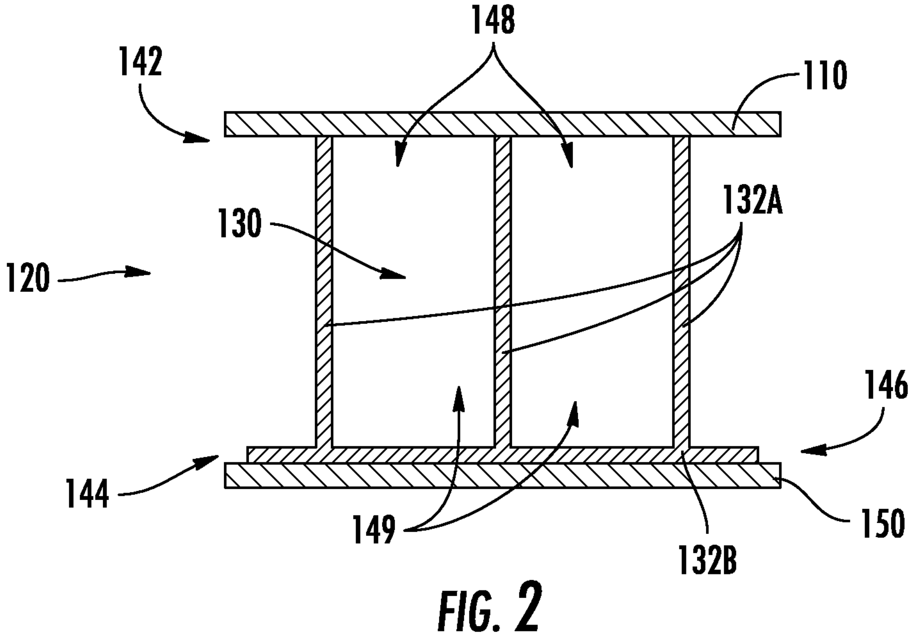
FIG. 2 provides a cross-sectional slice view of a portion of a composite panel having a plurality of cells being closed on one face.
Figure 5:
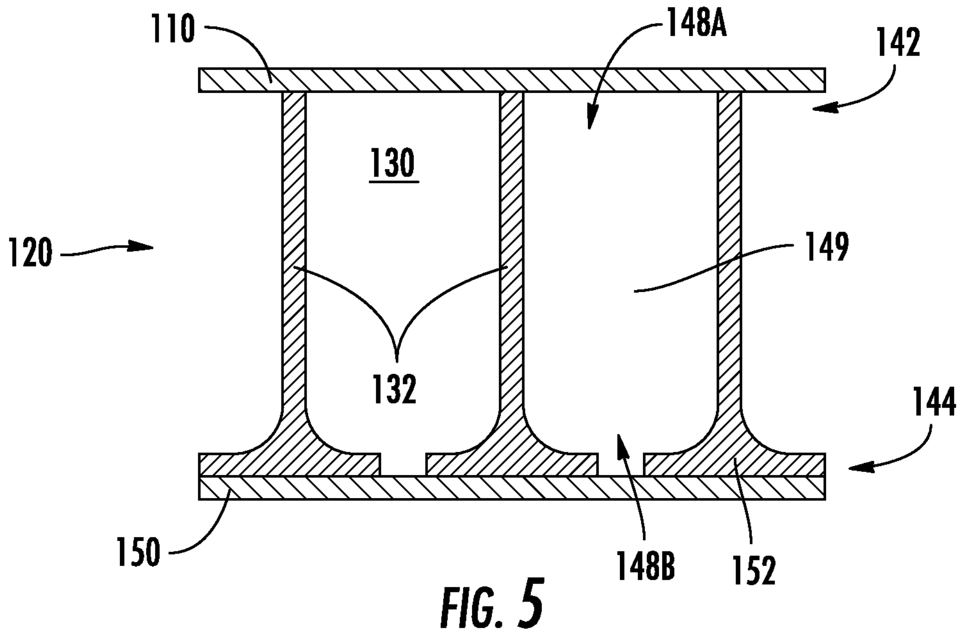
FIG. 5 provides a cross-sectional slice view of a portion of a composite panel having the plurality of cells being partially closed on one face.

For example, as illustrated in FIG. 2, the cross-sectional geometry 101 of a cross-sectional slice of the plurality of hollow cells 130 is shown. The cross-sectional geometry 101 is oriented such that the top face 142 is adjacent the ceramic matrix composite face sheet 110 and the bottom face 144 is adjacent the ceramic matrix composite back sheet 150. The one or more walls 132 are depicted with vertical walls 132*a* and a horizontal wall 132*b* parallel to the ceramic matrix composite back sheet 150. In this particular embodiment, each of the plurality of hollow cells 130 has a closed face 146 and an open face 148. As used herein, "closed face" refers to the walls 132 of the ceramic core structure 120 enclosing (e.g., capping) the hollow cell 130 at one of the top face 142 or the bottom face 144. In such embodiments, the closed face (e.g., at the bottom face 144 in FIG. 5) would have a bottom cross-sectional geometry 101*b* that is smaller than the top cross-sectional geometry 101*a* of the top face that is an open face. In the embodiment depicted in FIG. 5, the closed face 146 is adjacent to the bottom face 144, e.g., on the end with the horizontal wall 132*b*. Also as used herein, the term "open face" refers to the cell 130 being open on either the top face 142, the bottom face 144, or both. In other words, the "open face" of the hollow cell 130 refers to the top face 142 or the bottom face 144 as having at least some open cross-sectional area between the vertical walls 132*a* of the one or more walls 132. In the embodiment of FIG. 5, the open face 148 is on the opposite end of the vertical walls 132*a* where there is no horizontal wall 132*b* adjacent the ceramic matrix composite face sheet 110.

Figure 3:
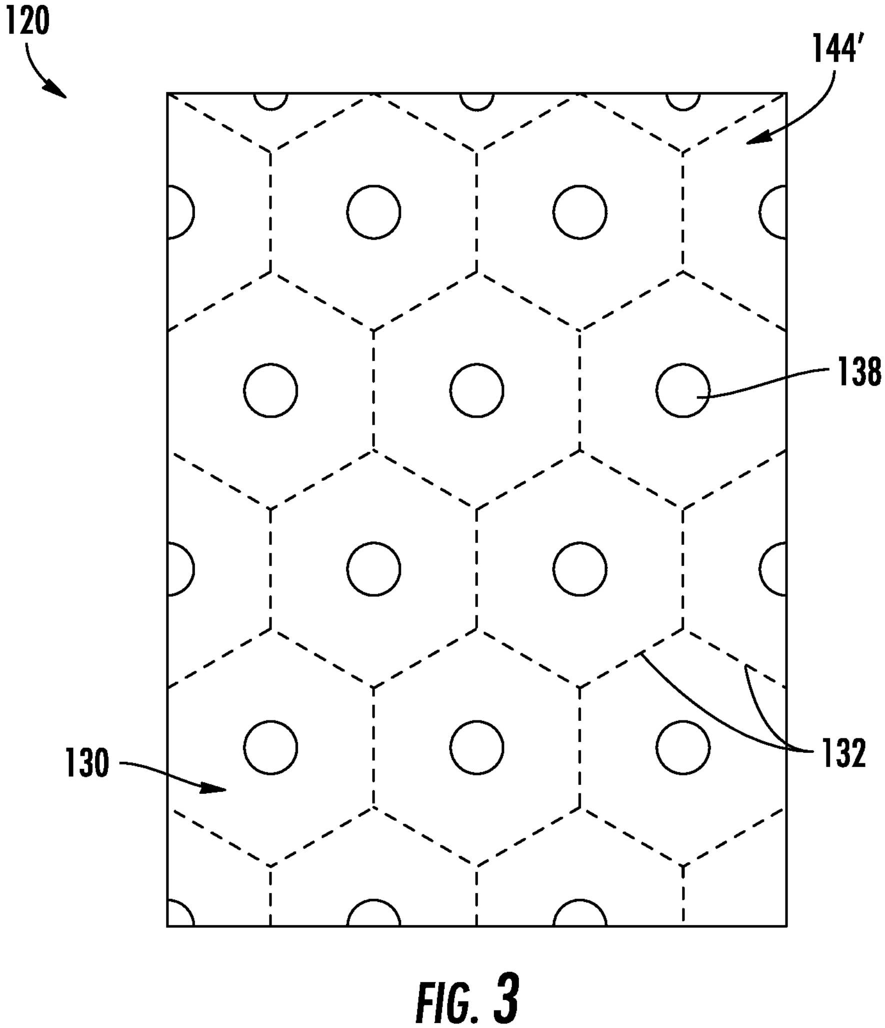
FIG. 3 provides a top view of a portion of a core structure with closed ends of a plurality of cells.

Referring now to FIG. 3, a view of a composite panel 100 from a partially open bottom face 144' is shown, with the one or more walls 132 shown dashed. Each of the plurality of hollow cells 130 includes a hole 138. The hole 138 can be configured and utilized for removing debris or for providing airflow. For example, all or part of the composite panel 100 may be additively manufactured. For instance, an additively-manufactured ceramic core structure may be produced via binder jet printing or other additive manufacturing techniques. However, the additively-manufactured ceramic core structure may require de-powdering (e.g., removing loose powder from the hollow interior 149 of the hollow cell 130). The hole 138 would allow for the de-powdering, e.g., the removal of the powder resulting from binder jet printing. Although the hole 138 is shown in the center of each hollow cell 130 on the partially open bottom face 144', it will be appreciated that the hole 138 may additionally or alternatively be located on any of the one or more walls 132 of each hollow cell 130. Furthermore, the hole 138 may also be located off-center of each hollow cell 130. The hole 138 may additionally be in a different location in each hollow cell 130.

While FIG. 2 illustrates each top face 142 being an open face 148 and each bottom face 144 being a closed face 146, it should be appreciated that a variety of configurations within the composite panel 100 may alternatively or additionally be realized using a combination of open faces 148 and closed faces 146.

Figure 4:
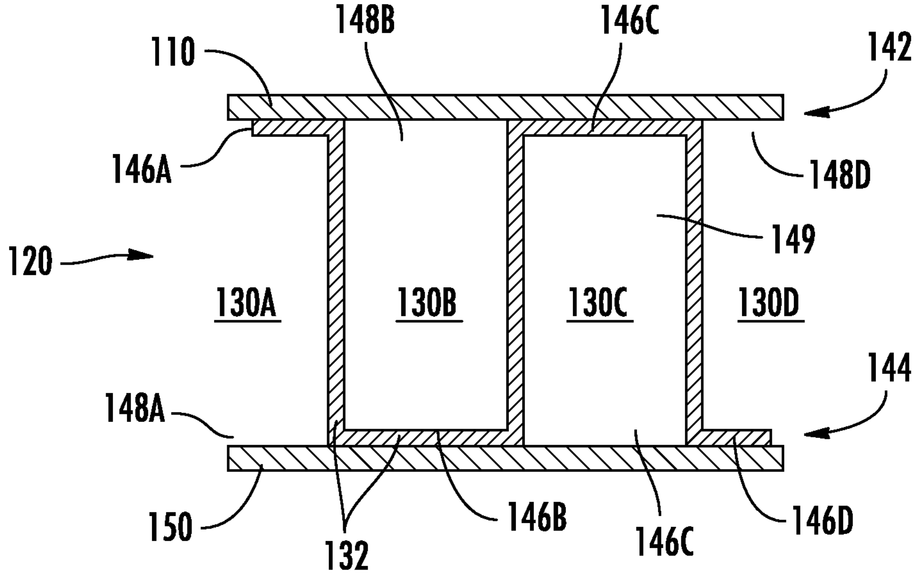
FIG. 4 provides a cross-sectional slice view of a portion of a composite panel having a plurality of cells with alternating closed ends.

Referring now to FIG. 4, a cross-sectional slice of the ceramic core structure 120 with the plurality of hollow cells 130 is shown with the one or more walls 132 arranged such that openings for the hollow cells 130 are in an interspersed pattern (e.g., alternating or intermittent pattern of open faces 148 and closed faces 146). As illustrated in FIG. 4, the closed face 146 of each hollow cell 130 is in the alternating pattern with the open face 148 of a hollow cell 130 adjacent thereto, top to bottom and vice versa as a non-limiting example. It will be understood that multiple top faces 142 in adjacent hollow cells 130 could have closed faces 146, which may in turn be adjacent hollow cells with bottom faces 144 being closed faces 146 and that would still be considered interspersed. Further any suitable repeating pattern or random placement can be utilized to intersperse.

For example, the cross-sectional illustration depicts a first closed face **146*a* on the top face 142 and a first open face 148*a* on the bottom face 144 in a first hollow cell 130*a*; a second open face 148*b* on the top face 142 and a second closed face 146*b* in a second cell 130*b*; a third closed face 146*c* on the top face 142 and a third open face 148*c* in a third cell 130*c*; and a fourth open face 148*d* on the top face 142 and a fourth closed face 146*d* in a fourth cell 130*d*. The ceramic matrix composite face sheet 110 and the ceramic matrix composite back sheet 150 are also shown sandwiching the ceramic core structure 120. Such embodiments of interspersed (alternating or intermittent) open faces 148 and closed faces 146 on one or both of the top side 141 and the bottom side 143 of the ceramic core structure 120 can provide a composite panel 100 that still provides reduced weight and cost by lowering the amount of material used in the ceramic core structure 120, but provides enhanced bonding with the ceramic matrix composite face sheet 110 or ceramic matrix composite back sheet 150 via the additional material at their respective interfaces with the ceramic core structure 120**.

Referring now to FIG. 5, a cross-sectional slice of the plurality of hollow cells 130 is shown with the first open face **148*a* in each hollow cell 130 along the top face 142 and the second open face 148*b* in each hollow cell 130 along the bottom face 144. As shown, each of the one or more walls 132 may also include a tapered interface 152 along the second open face 148*b*. The tapered interface 152 comprises additional material from the ceramic core structure 120 structure that extends inwards from at least one of the plurality of walls 132. The tapered interface 152 may thereby provide additional surface area for bonding with a ceramic matrix composite face sheet 110 or ceramic matrix composite back sheet 150, while also providing additional structural support at the joint (e.g., by distributing stress along the tapered interface 152 instead of a concentrating stress at a 90 degree joint). In some embodiments, the tapered interface 152 extends on each side of the one or more walls 132 and includes a curved configuration. For instance, the tapered interface 152 may have a constant or non-constant radius as it extends from the one or more walls 132**.

It should be appreciated that tapered interfaces 152 may be utilized in a variety of configurations, such as with closed faces 146 or open faces 148, at one or both of the top faces 142 or bottom faces 144, and within each hollow cell 130 or within only some hollow cells 130.

Figure 6:
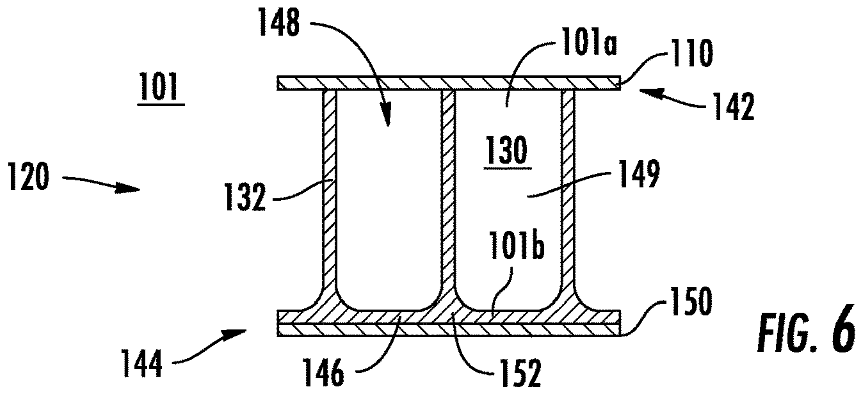
FIG. 6 provides a cross-sectional slice view of the plurality of cells having a tapered interface on a closed end of each cell.

For example, with reference to FIG. 6, a cross-sectional slice of the plurality of the hollow cells 130 is shown with an open face 148 in each hollow cell 130 along the top face 142 and the closed face 146 in each hollow cell 130 along the bottom face 144. In the depicted embodiment, each hollow cell 130 further includes the tapered interface 152 on each side of the one or more walls 132. Further, the tapered interface 152 of each of the one or more walls 132 is at least part of the closed face 146, e.g., the tapered interface 152 of each of the one or more walls 132 extends such that it touches the adjacent tapered interface 152, and at least partially becomes the closed face 146.

Figure 7:
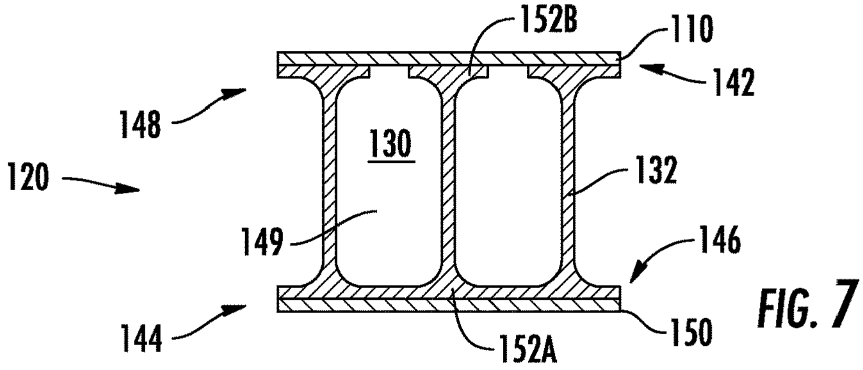
FIG. 7 provides a cross-sectional slice view of a portion of a composite panel having a plurality of cells closed on one face with tapered interfaces and open on the opposite face with tapered interfaces.

Referring now to FIG. 7, a cross-sectional slice of the plurality of hollow cells 130 is shown with the open face 148 in each hollow cell 130 along the top face 142 and the closed face 146 in each hollow cell 130 along the bottom face 144. In the depicted embodiment, each of the one or more walls 132 adjacent the closed face 146 further includes a first tapered interface **152*a* extending on either side of the one or more walls 132. Additionally, the first tapered interface 152*a* of each of the one or more walls 132 extends such that it touches an adjacent first tapered interface 152*a*, making the closed face 146 along the bottom face 144. Each of the one or more walls 132 may also have a second tapered interface 152*b* on the open face 148, such that each end of each of the one or more walls 132 has a tapered interface 152**.

Figure 8:
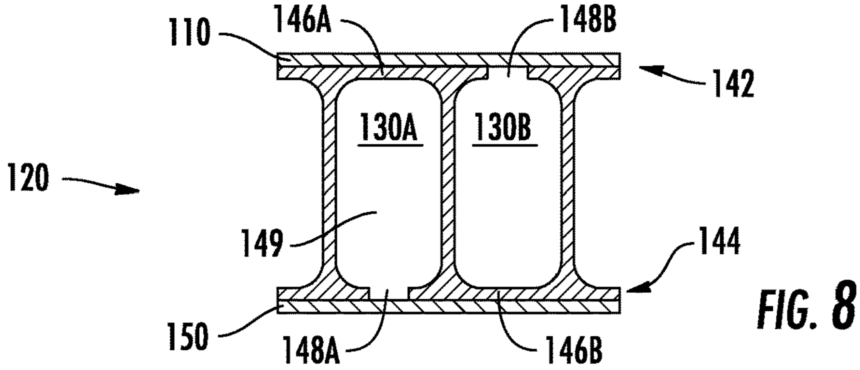
FIG. 8 provides a cross-sectional slice view of a portion of a composite panel having a plurality of cells having alternating open positions.

Referring now to FIG. 8, a cross-sectional slice of the ceramic core structure 120 is illustrated with the plurality of hollow cells 130 shown having top faces 142 and bottom faces 144 in an alternating pattern (e.g., similar to FIG. 7), with each of the one or more walls 132 further including the tapered interface 152. For example, as depicted, the first cell **130*a* has a first closed face 146*a* on the top face 142 and a first open face 148*a* on the bottom face 144. In the second cell 130*b*, there is a second closed face 146*b* on the bottom face 144 and the second open face 148*b* on the top face 142. Each of the one or more walls includes the tapered interface 152, with adjacent tapered interfaces 152 connecting and creating the first closed face 146*a* and the second closed face 146*b*. While certain embodiments are illustrated herein, the tapered interfaces may be present in any ordered or random pattern within the composite panel 100**.

Figure 9:
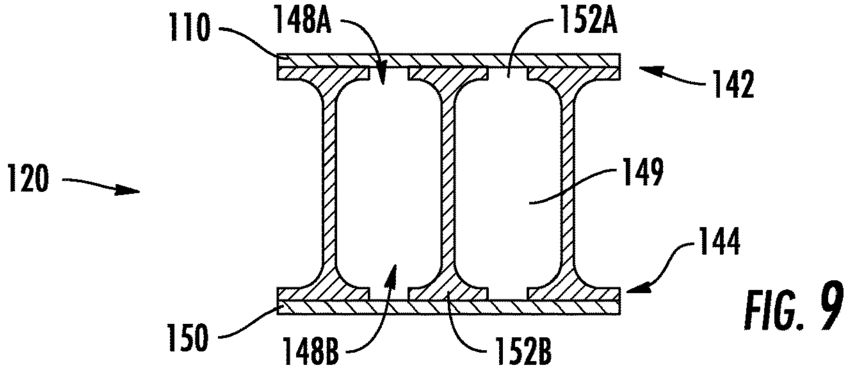
FIG. 9 provides a cross-sectional slice view of a portion of a composite panel having a plurality of cells having a tapered interface on each of the one or more walls on both faces.

Referring now to FIG. 9, a cross-sectional slice of each of the plurality of hollow cells 130 is illustrated having the first open face **148*a* on the top face 142 and the second open face 148*b* on the bottom face 144. Further, each of the one or more walls 132 has the first tapered interface 152*a* with a curve on either side of the one or more walls 132 along the top face 142 and a curve on either side of the one or more walls 132 along the second tapered interface 152***b* on the side of the bottom face 144. While FIG. 9 illustrates each interface with the ceramic matrix composite face sheet 110 and composite back sheet 150 has having a substantially similar profile, the respective interfaces may also vary in profile, shape, or size, such as based on a predetermined or predicted loading conditions.

While various configurations of composite panels are disclosed herein, including with or without uniform cross-sectional geometries 101, closed faces 146, or tapered interfaces, it should be appreciated that these configurations are not intended to be limiting. Alternative, or additional, composite panels 100 may also be utilized.

Figure 10:
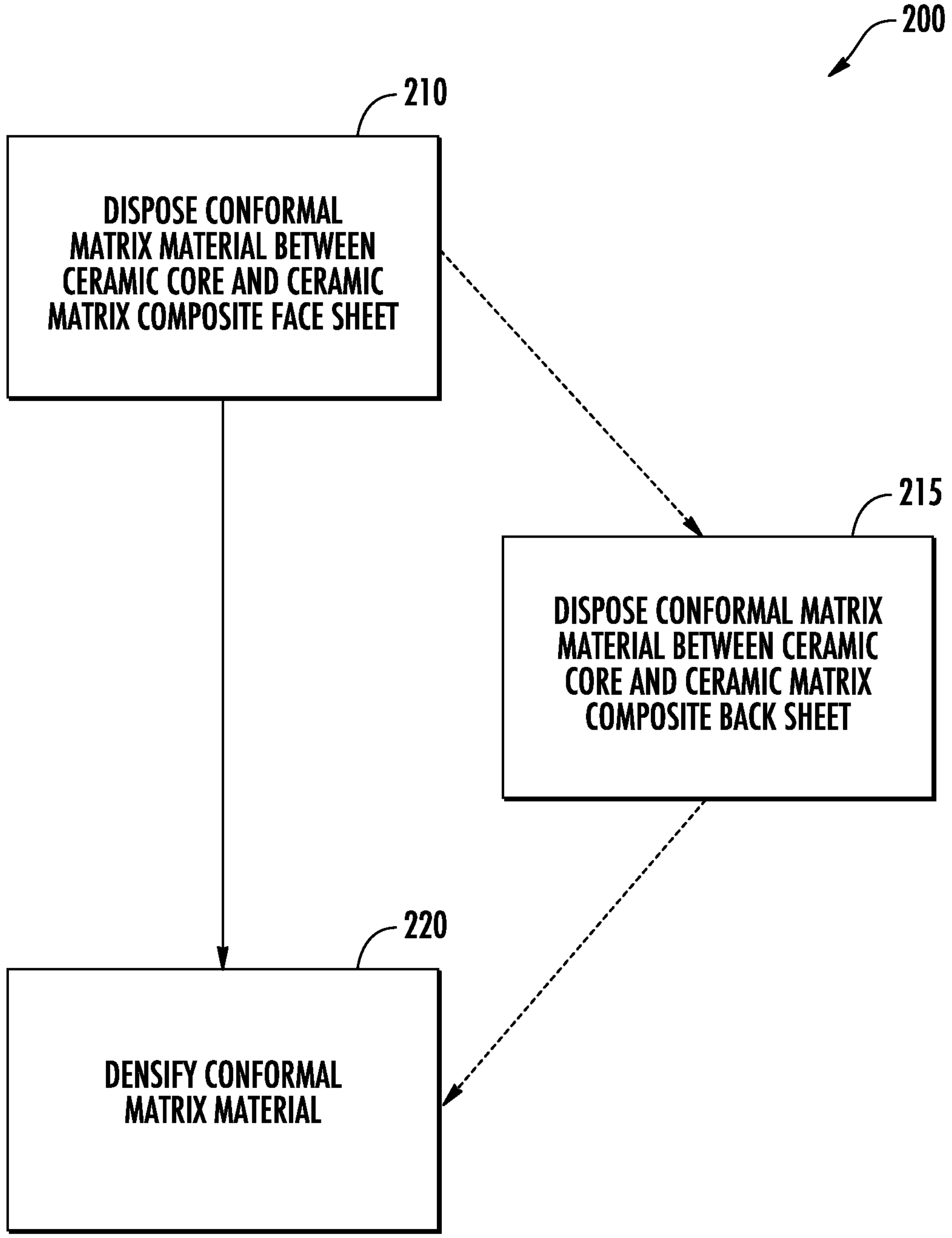
FIG. 10 provides a flowchart diagram showing an exemplary method of manufacturing the composite panel.
Figure 11:
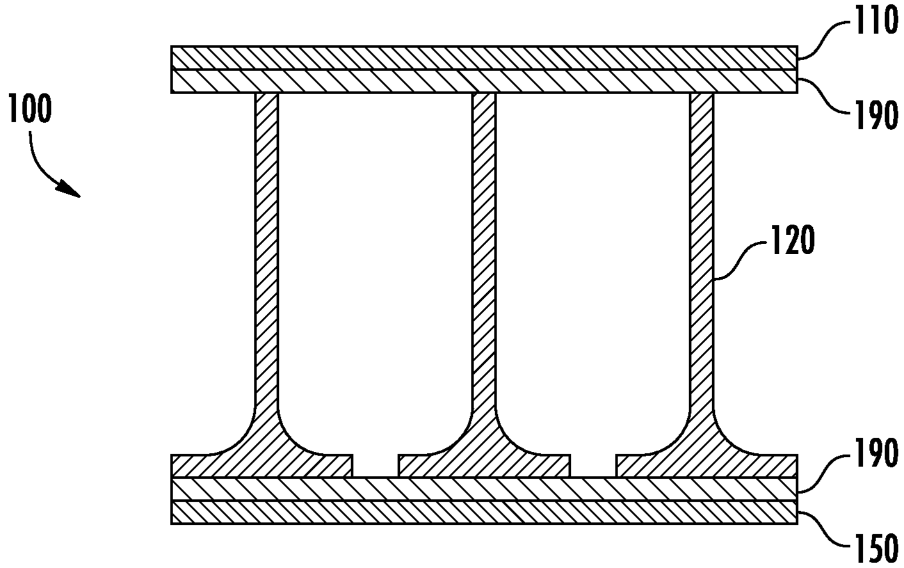
FIG. 11 provides a cross-sectional slice view of a portion of a composite panel having a plurality of cells having a pliable matrix material.
Figure 12:
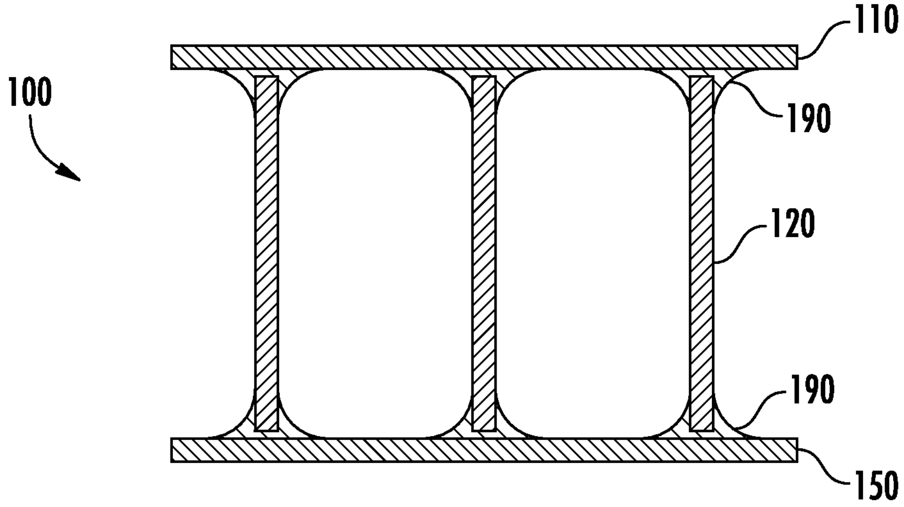
FIG. 12 provides a cross-sectional slice view of another embodiment of a portion of a composite panel having a plurality of cells having a pliable matrix material.

Referring now to FIGS. 10-12, composite panels 100 and a method 200 for assembling the same are illustrated utilizing pliable matrix material 190, which can be used, for example, for assembling the composite panels illustrated in FIGS. 1-9. Generally, the pliable matrix material 190 is a supplemental material placed between the ceramic core structure 120 and the ceramic matrix composite face sheet 110 or the ceramic matrix composite back sheet 150 to bond the respective components together and accommodate for dimensional mismatches. That is, the pliable matrix material 190 is capable of conforming (i.e., taking the geometry and shape of the adjacent components) to the interface between the between the ceramic core structure 120 and the ceramic matrix composite face sheet 110 or the ceramic matrix composite back sheet 150. After application, the pliable matrix material 190 can be densified, such as through infiltration, to conform to and bond the adjacent components in the composite panel 100.

The pliable matrix material 190 may be a ceramic filler material comprising a liquid carrier (e.g., solvent), a powder, and a polymeric binder (e.g., resin) disposed in the liquid carrier.

The liquid carrier of the pliable matrix material 190 may be selected such that it partially or fully dissolves one or more organic components of the formulation, such as the binder. In some embodiments, the liquid carrier can comprise water, one or more alcohols, or other organic liquids (e.g., acetone or toluene), or combinations thereof. The amount of liquid carrier can also be adjusted to change the physical consistency of the pliable matrix material 190, such as by increasing the amount of the liquid carrier so that the pliable matrix material 190 can be applied as a pliable matrix material paste, or decreasing the amount of liquid carrier so that the pliable matrix material 190 can be applied as a tape. For instance, in some embodiments, the liquid carrier may comprise 50% to 70% by volume of the pliable matrix material 190, or from 55% to 65% by volume of the pliable matrix material 190. Such embodiments can produce a pliable matrix material 190 that is fluid but with a low viscosity. In some embodiments, the liquid carrier may comprise 5% to 15% by volume of the pliable matrix material 190, or from 7% to 13% by volume of the pliable matrix material 190. Such embodiments can produce a pliable matrix material 190 in the form of a tape or film.

The powder of the pliable matrix material 190 may comprise at least one of silicon, silicon carbide, or carbon. In some embodiments, the powder comprises 10 percent to 90 percent carbon by weight. In some embodiments, the powder comprises 20 percent to 80 percent carbon by weight. In some embodiments, the powder comprises 30 percent to 70 percent carbon by weight. In some embodiments, the powder comprises 40 percent to 60 percent carbon by weight. In some embodiments, the powder may additionally, or alternatively, include other forms of material such as fiber material. For instance, the pliable matrix material 190 can include a scrim material comprising randomly oriented carbon fibers such as to form a tape. In some embodiments, the pliable matrix material 190 may comprise chopped fibers.

In some embodiments, the powder of the pliable matrix material 190 comprises carbon and silicon carbide. Carbon or other reactive materials can enable a reaction with silicon during melt infiltration to form silicon carbide. For example, in some embodiments, the powder comprises 40 percent to 60 percent carbon by weight and 40 percent to 60 percent silicon carbide by weight. In some embodiments, the powder comprises 45 percent to 55 percent carbon by weight and 45 percent to 55 percent silicon carbide by weight.

The polymeric binder of the pliable matrix material 190 may be used to alter the flow properties of the pliable matrix material 190, such as by thickening the pliable matrix material 190 to allow it to remain in place (e.g., as a paste) when applied to the ceramic core structure 120, the ceramic matrix composite face sheet 110, or the ceramic matrix composite back sheet 150 as described herein.

Optionally, the pliable matrix material 190 further comprises other ingredients disposed in the liquid carrier, such as a shrinkage control agent, which provides a measure of rigidity to the formulation as it is processed. For example, the mass loss associated with volatilizing the liquid carrier and converting the binder to char creates a driving force to shrink the size of the remaining material, and excessive shrinkage can lead to undesirable cracking within the product material. Including a shrinkage control agent such as short fibers can provide mechanical support to mitigate the tendency to shrink. Alternatively, or additionally, the pliable matrix material 190 can comprise a plasticizer, a dispersant, other supplemental material(s), or combinations thereof.

The pliable matrix material 190 (e.g., the liquid carrier, the powder, or the polymeric binder) may be selected to have substantially similar thermodynamic, physical, or chemical properties to the rest of the components of the composite panel 100, e.g., such that the thermodynamic, physical, or chemical properties of the pliable matrix material 190 are well-matched to the thermodynamic, physical, or chemical properties of the of the ceramic core structure 120, the ceramic matrix composite face sheet 110, or the ceramic matrix composite back sheet 150.

For instance, the pliable matrix material 190, the ceramic core structure 120, the ceramic matrix composite face sheet 110, and the ceramic matrix composite back sheet 150 may have a substantially similar coefficient of thermal expansion, elastic modulus, thermal conductivity, oxidation resistance, material compatibility, or chemical composition. As one example, the pliable matrix material 190 may have a material compatibility that helps prevent an unfavorable or undesirable reaction between the pliable matrix material 190 and the ceramic core structure 120, the ceramic matrix composite face sheet 110, or the ceramic matrix composite back sheet 150. Because the thermodynamic, physical, or chemical properties are substantially similar or well-matched, the joint between the ceramic core structure 120 and the ceramic matrix composite face sheet 110 or the joint between the ceramic core structure 120 and the ceramic matrix composite back sheet 150 need not be defined as precisely as otherwise required since the pliable matrix material 190 can thereby accommodate dimensional mismatches by filling in the gaps.

Referring to FIG. 10, the method 200 first comprises disposing the pliable matrix material 190 between the top side 141 of the ceramic core structure 120 and the ceramic matrix composite face sheet 110. The pliable matrix material 190 can be applied in a variety of configurations, such as, for example, laying down a pliable matrix material paste or tape comprising the pliable matrix material, or spraying the pliable matrix material.

In some embodiments, such as that illustrated in FIG. 11, the pliable matrix material 190 may be applied as a conformal matrix ply. The conformal matrix ply may comprise a relatively flat and solid structure that can sit between the ceramic core structure 120 and the ceramic matrix composite face sheet 110. Alternatively, or additionally, in some embodiments, such as that illustrated in FIG. 12, the pliable matrix material 190 may be applied as a pliable matrix material paste. The paste can be placed on or around the joints between the ceramic core structure 120 and the ceramic matrix composite face sheet 110. Any suitable application technique can be used for the paste, such as, but not limited to, brushing, injecting, molding, or the like. In some embodiments where the pliable matrix material 190 comprises a pliable matrix material paste, the pliable matrix material 190 may form a fillet between the ceramic core structure 120 and the ceramic matrix composite face sheet 110. Such fillets may help reduce stress concentrations at the joints due to the rounded shape and material bonding.

In some embodiments, the method 200 may also comprise disposing additional pliable matrix material 190 between the bottom face 144 of the ceramic core structure 120 and a ceramic matrix composite back sheet 150. As discussed above, the ceramic matrix composite face sheet 110 and the ceramic matrix composite back sheet 150 may comprise the same type of material or different types of material.

The method 200 further comprises densifying the pliable matrix material 190 to bond the pliable matrix material 190 with the ceramic matrix composite face sheet 110 (and the ceramic matrix composite back sheet 150 when present). That is, the pliable matrix material 190 will form a conformal interface layer of matrix material 190 that is densified that conformed to and bonded with both the ceramic core structure 120 and the ceramic matrix composite face sheet 110. Where present, the additional matrix material 190 (between the ceramic core structure 120 and the ceramic matrix composite back sheet 150) will also densify with the adjacent components.

Densification in step 220 can comprise undergoing burn-out (or firing) and densifying the remaining material. For example, the pliable matrix material 190 may be heated (fired) in a vacuum or inert atmosphere to decompose any binders and remove any solvents in the pliable matrix material 190 and convert pliable matrix material 190 to the desired ceramic matrix material. Due to decomposition of the binders during burnout, the pliable matrix material 190 will be porous.

In some embodiments, densification in step 220 can comprise densifying the pliable matrix material 190 with a densifying material via one or more infiltration processes. Infiltration can include may comprise melt infiltration (MI), chemical vapor infiltration (CVI), or polymer infiltration and pyrolysis (PIP), to fill the porosity and yield a densified composite panel 100. Specific densifying material, processing techniques, and parameters for the above process will depend on the particular composition of the materials.

For example, silicon carbide CMC components may be infiltrated with molten silicon, e.g., through a silicon MI process or a reactive MI process. In some embodiments, densification through melt infiltration of one or more components (e.g., ceramic matrix composite face sheet 110 or ceramic core structure 120) may occur prior to lamination. The molten silicon can fill in the porosity while also reaching with present carbon to form silicon carbide. Other densification techniques include, but are not limited to, PIP processes (e.g., where silicon carbide reinforcement material components are infiltrated with a preceramic polymer, such as polysilazane and then heat treated to form a SiC matrix), oxide/oxide processes (e.g., for aluminum or alumino-silicate reinforcement material components), and CVI processes (e.g., for carbon fiber reinforced silicon carbide matrix (C/SiC) CMCs, for SiC/SiC CMCs, etc.). Thus, in some embodiments, the densifying material may comprise silicon or silicon carbide. In some embodiments, the densifying material may include germanium. In some embodiments, the densifying material may include silicon, germanium, boron, silicon germanium, or combinations thereof. Using melt infiltration may reduce free silicon in the matrices, provide stronger properties to the composite panel, or define different structures in the resulting matrices. Additionally, densifying a material, e.g., to produce a silicon-bonded SiC matrix, may reduce porosity within the subsequent matrix, thereby creating a denser, stronger, and more durable bond that is capable of withstanding extreme operating conditions, including high temperatures. As a result of densification, the composite panel 100 will include matrix material 190 that is densified and bonded to both the ceramic core structure 120 and the ceramic matrix composite face sheet 110.

The composite panel 100 as disclosed and described herein may be used in a variety of industrial machines, including, but not limited to, one or more components of turbomachines. Moreover, the composite panel 100 disclosed and described herein can provide a more cost-effective, lighter, and potentially stronger alternative to solid composite structures. Moreover, the composite panels 100 disclosed and described herein further provides enhanced bonding between the ceramic core structure 120 and the ceramic matrix composite face sheet 110 or between the ceramic core structure 120 and the ceramic matrix composite back sheet 150, such as by accommodating dimensional mismatches between the ceramic core structure 120 and the ceramic matrix composite face sheet 110 or ceramic matrix composite back sheet 150 using the pliable matrix material 190.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A method of assembling a composite panel, the method comprising disposing a pliable matrix material between a first side of a ceramic core structure and a ceramic matrix composite face sheet, wherein the ceramic core structure comprises a plurality of hollow cells defined by a plurality of walls extending from the first side of the ceramic core structure to a second side of the ceramic core structure opposite the first side; and densifying the pliable matrix material to bond the pliable matrix material with the ceramic core structure and the ceramic matrix composite face sheet.

The method of any clause herein, wherein the pliable matrix material comprises a liquid carrier, a powder, and a polymeric binder.

The method of any clause herein, wherein the powder comprises 10 percent to 90 percent carbon by weight.

The method of any clause herein, wherein the powder comprises carbon and silicon carbide.

The method of any clause herein, wherein the powder comprises 45 percent to 55 percent carbon by weight and 45 percent to 55 percent silicon carbide by weight.

The method of any clause herein, wherein the liquid carrier comprises 50% to 70% by volume of the pliable matrix material.

The method of any clause herein, wherein the pliable matrix material comprises a pliable matrix material paste.

The method of any clause herein, wherein the pliable matrix material forms a fillet between the ceramic matrix composite face sheet and the ceramic core structure.

The method of any clause herein, wherein the pliable matrix material comprises a pliable matrix material ply.

The method of any clause herein, wherein densifying the pliable matrix material comprises densifying via melt infiltration.

The method of any clause herein, wherein a densifying material is silicon, germanium, boron, or combinations thereof.

The method of any clause herein, wherein densifying the pliable matrix material comprises densifying via chemical vapor infiltration.

The method of any clause herein, wherein densifying the pliable matrix material comprises densifying via polymer infiltration and pyrolysis.

The method of any clause herein, further comprising additively manufacturing the ceramic core structure.

The method of any clause herein, wherein the plurality of walls are unitarily and monolithically formed to define the plurality of hollow cells.

The method of any clause herein, further comprising disposing the pliable matrix material between the second side of the ceramic core structure and a ceramic matrix composite back sheet; and densifying the pliable matrix material to bond the pliable matrix material with the ceramic core structure and the ceramic matrix composite back sheet.

A composite panel composite panel comprising a ceramic core structure comprising a plurality of hollow cells defined by a plurality of walls extending from a first side of the ceramic core structure to a second side of the ceramic core structure, the second side opposite the first side; a ceramic matrix composite face sheet disposed at the first side of the ceramic core structure; and a matrix material that is densified and bonded with both the ceramic core structure and the ceramic matrix composite face sheet.

The composite panel of any clause herein, wherein the matrix material comprises silicon carbide.

The composite panel of any clause herein, further comprising a ceramic matrix composite back sheet disposed at the second side of the ceramic core structure; and additional matrix material that is densified and bonded to both the ceramic core structure and the ceramic matrix composite back sheet.

The composite panel of any clause herein, wherein one or more of the plurality of hollow cells has a cross-sectional geometry that is nonuniform from the top side to the bottom side.

The composite panel of any clause herein, wherein one or more of the hollow cells comprises a hexagonal cross section between the first side and the second side.

A composite panel comprising an additively-manufactured ceramic core structure comprising a plurality of hollow cells defined by a plurality of walls extending from a top face to a bottom face; a ceramic matrix composite face sheet; and a conformal interface layer bonding the top face of the additively-manufactured ceramic core structure to the ceramic matrix composite face sheet.

The composite panel of any clause herein, wherein the conformal interface layer is a matrix material densified by melt infiltration, chemical vapor infiltration, or polymer infiltration and pyrolysis.

The composite panel of any clause herein, wherein the ceramic core structure comprises SiC or Si, the ceramic matrix composite face sheet comprises a SiC matrix, and the conformal interface layer is a densified matrix material comprising Si or SiC as the densifying material.

The composite panel of any clause herein, wherein at least a first portion of the plurality of hollow cells comprises a top cross-sectional area at the top face that is smaller than at least one of a bottom cross-sectional area at the bottom face or a midspan cross-sectional area between the top face and the bottom face.

We claim:

1. A method of assembling a composite panel, the method comprising:

disposing a pliable matrix material tape between a first side of a ceramic core structure and a ceramic matrix composite face sheet, wherein the ceramic core structure comprises a plurality of hollow cells defined by a plurality of walls extending from the first side of the ceramic core structure to a second side of the ceramic core structure opposite the first side, and wherein the pliable matrix material tape comprises chopped fibers; and densifying the pliable matrix material tape to bond the pliable matrix material tape with the ceramic core structure and the ceramic matrix composite face sheet.

2. The method of claim 1, wherein the pliable matrix material tape comprises a liquid carrier, a powder, and a polymeric binder.

3. The method of claim 2, wherein the powder comprises 10 percent to 90 percent carbon by weight, and wherein at least a portion of the chopped fibers comprises chopped carbon fibers.

4. The method of claim 2, wherein the powder comprises carbon and silicon carbide.

5. The method of claim 4, wherein the powder comprises 45 percent to 55 percent carbon by weight and 45 percent to 55 percent silicon carbide by weight.

6. The method of claim 2, wherein the liquid carrier comprises 5% to 15% by volume of the pliable matrix material tape.

7. The method of claim 1, wherein the pliable matrix material tape forms a fillet between the ceramic matrix composite face sheet and the ceramic core structure.

8. The method of claim 1, wherein densifying the pliable matrix material tape comprises densifying via melt infiltration.

9. The method of claim 8, wherein a densifying material is silicon, germanium, boron, or combinations thereof.

10. The method of claim 1, wherein densifying the pliable matrix material tape comprises densifying via chemical vapor infiltration.

11. The method of claim 1, wherein densifying the pliable matrix material tape comprises densifying via polymer infiltration and pyrolysis.

12. The method of claim 1, further comprising additively manufacturing the ceramic core structure.

13. The method of claim 1, wherein the plurality of walls are unitarily and monolithically formed to define the plurality of hollow cells.

14. The method of claim 1, further comprising disposing the pliable matrix material tape between the second side of the ceramic core structure and a ceramic matrix composite back sheet; and densifying the pliable matrix material tape to bond the pliable matrix material tape with the ceramic core structure and the ceramic matrix composite back sheet.

15. A composite panel comprising:

a ceramic core structure comprising a plurality of hollow cells defined by a plurality of walls extending from a first side of the ceramic core structure to a second side of the ceramic core structure, the second side opposite the first side;

a ceramic matrix composite face sheet disposed at the first side of the ceramic core structure; and a matrix material tape that is densified and bonded with both the ceramic core structure and the ceramic matrix composite face sheet, wherein the matrix material tape comprises chopped fibers.

16. The composite panel of claim 15, wherein the matrix material tape comprises silicon carbide.

17. The composite panel of claim 15, further comprising:

a ceramic matrix composite back sheet disposed at the second side of the ceramic core structure; and additional matrix material tape that is densified and bonded to both the ceramic core structure and the ceramic matrix composite back sheet.

18. A composite panel comprising:

an additively-manufactured ceramic core structure comprising a plurality of hollow cells defined by a plurality of walls extending from a top face to a bottom face;

a ceramic matrix composite face sheet; and a conformal interface layer tape bonding the top face of the additively-manufactured ceramic core structure to the ceramic matrix composite face sheet, wherein the conformal interface layer tape comprises chopped fibers.

* * * * *